US011354997B2

(12) United States Patent
Kearse

(10) Patent No.: US 11,354,997 B2
(45) Date of Patent: Jun. 7, 2022

(54) PROXIMITY WARNING ASSEMBLY

(71) Applicant: Meliah Kearse, Suffolk, VA (US)

(72) Inventor: Meliah Kearse, Suffolk, VA (US)

(*) Notice: Subject to any disclaimer, the term of this patent is extended or adjusted under 35 U.S.C. 154(b) by 647 days.

(21) Appl. No.: 15/821,379

(22) Filed: Nov. 22, 2017

(65) Prior Publication Data
US 2018/0151050 A1    May 31, 2018

Related U.S. Application Data

(60) Provisional application No. 62/428,056, filed on Nov. 30, 2016.

(51) Int. Cl.
| G08B 21/04 | (2006.01) |
| G08B 21/22 | (2006.01) |
| G01S 17/08 | (2006.01) |
| G01S 15/08 | (2006.01) |
| G01S 15/04 | (2006.01) |
| G01S 17/88 | (2006.01) |
| G01S 15/88 | (2006.01) |
| G01S 17/04 | (2020.01) |

(52) U.S. Cl.
CPC .......... *G08B 21/0469* (2013.01); *G01S 15/04* (2013.01); *G01S 15/08* (2013.01); *G01S 15/88* (2013.01); *G01S 17/04* (2020.01); *G01S 17/08* (2013.01); *G01S 17/88* (2013.01); *G08B 21/22* (2013.01)

(58) Field of Classification Search
CPC .... G08B 21/04; G08B 21/22; G08B 21/0469; G01S 15/08; G01S 17/08; G01S 15/88; G01S 17/88; G01S 17/04; G01S 15/04
See application file for complete search history.

(56) References Cited

U.S. PATENT DOCUMENTS

| 5,557,259 | A | 9/1996 | Musa |
| 5,963,135 | A | 10/1999 | Marcke |
| 6,448,895 | B1 | 9/2002 | Ekkel |
| 7,023,350 | B2 | 4/2006 | Sanchez et al. |
| 8,659,414 | B1 | 2/2014 | Schuk |
| 9,349,301 | B2 * | 5/2016 | Ur ........................ A61H 3/061 |
| 9,355,547 | B2 * | 5/2016 | Stevens ................. G09B 21/00 |
| 9,576,460 | B2 * | 2/2017 | Dayal .................... G08B 21/02 |
| 9,578,307 | B2 * | 2/2017 | Moore .................... G06T 7/593 |
| 9,586,318 | B2 * | 3/2017 | Djugash ................. G06F 1/163 |
| 9,629,774 | B2 * | 4/2017 | Dayal ................ A44C 15/0015 |
| 2007/0063851 | A1 * | 3/2007 | Addison ................ G08B 21/22 340/573.1 |
| 2012/0218115 | A1 | 8/2012 | Chupa |
| 2012/0242481 | A1 * | 9/2012 | Gernandt .......... G08B 21/0219 340/539.13 |

(Continued)

*Primary Examiner* — Isam A Alsomiri
*Assistant Examiner* — Amie M Ndure
(74) *Attorney, Agent, or Firm* — Boudwin Intellectual Property; Daniel Boudwin

(57) ABSTRACT

A proximity warning assembly for detecting an approaching object. The proximity warning assembly includes a proximity sensor having an emitter and a receiver. The receiver detects a reflected emission generated by the emitter. The proximity sensor can determine the distance an object reflecting the emission is to the proximity sensor. An alert signal is generated by a proximity indicator that is operably connected to the proximity sensor when an object reaches a plurality of preset distances from the proximity sensor. The device can be worn by a user.

15 Claims, 3 Drawing Sheets

(56) References Cited

U.S. PATENT DOCUMENTS

| | | | | |
|---|---|---|---|---|
| 2013/0039152 A1* | 2/2013 | Liu | ............................ | A61F 9/08 |
| | | | | 367/99 |
| 2014/0080439 A1* | 3/2014 | Chun | .................... | H04W 4/029 |
| | | | | 455/404.1 |
| 2014/0240088 A1* | 8/2014 | Robinette | .......... | G08B 13/1427 |
| | | | | 340/5.61 |
| 2014/0309789 A1* | 10/2014 | Ricci | ........................ | H04W 4/21 |
| | | | | 700/276 |
| 2015/0068069 A1* | 3/2015 | Tran | ..................... | A43B 13/183 |
| | | | | 36/136 |
| 2016/0299230 A1* | 10/2016 | Morris | ..................... | G06F 16/29 |
| 2019/0046126 A1* | 2/2019 | Owen | ..................... | G06F 40/40 |

* cited by examiner

PROXIMITY WARNING ASSEMBLY

CROSS REFERENCE TO RELATED APPLICATIONS

This application claims the benefit of U.S. Provisional Application No. 62/428,056 filed on Nov. 30, 2016. The above identified patent application is herein incorporated by reference in its entirety to provide continuity of disclosure.

BACKGROUND OF THE INVENTION

The present invention relates to object detection apparatuses. Specifically, the present invention provides a proximity sensor coupled to a proximity indicator, wherein the proximity sensor and proximity indicator are integrated into a garment to be worn by a user.

Many individuals walk or exercise alone outdoors. While a person is exercising, their focus tends to be myopic towards their current activity. This myopic focus leaves outdoor exercisers vulnerable to sneak attack, especially from an aggressor that approaches from outside the line of sight of the exerciser, e.g. from behind.

Several devices have been proposed to reduce the likelihood of an attack on an unaware exerciser from behind. One such device provides a selectively wearable detector that detects the presence of an object approaching a wearer from behind. This known device also alerts a wearer when an object is detected. The known devices in the art do not provide a proximity sensor that can alert a wearer of when a rear approaching object reaches a plurality of preset distances away from the wearer.

SUMMARY OF THE INVENTION

In view of the foregoing disadvantages inherent in the known types of proximity sensors now present in the known art, the present invention provides a proximity wherein the same can be utilized for providing convenience for the user when preventing attack from a rear approaching object by indicating when an object has reached a plurality of preset distances from the user. The present assembly comprises a proximity sensor having an emitter and a receiver. The emitter emits a signal outward from the proximity detector and the receiver is configured to detect a reflected signal that is returned to the proximity detector by a reflecting object. The proximity detector is configured to determine the relative distance between a reflecting object and the receiver. A microcontroller is operably connected to the proximity sensor and a proximity indicator. The microcontroller is configured to actuate the proximity indicator each time a reflecting object is detected at one of a plurality of preset distances from the proximity sensor.

One object of the present nvention is to provide a proximity warning assembly that detects an object approaching a wearer from outside of the line-of-sight of the wearer, wherein the assembly then indicates to the wearer when the approaching object reaches each one of a plurality of preset distances from the wearer.

Another object of the present invention is to provide a proximity warning assembly that is affixed to a wearable band or other garment.

Yet another object of the present invention is to provide a proximity warning assembly that generates different audible alert signals corresponding to each of a plurality of preset distances an object approaching a wearer is detected.

One further object of the present invention is to provide a proximity warning assembly that is affixed to a hat.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
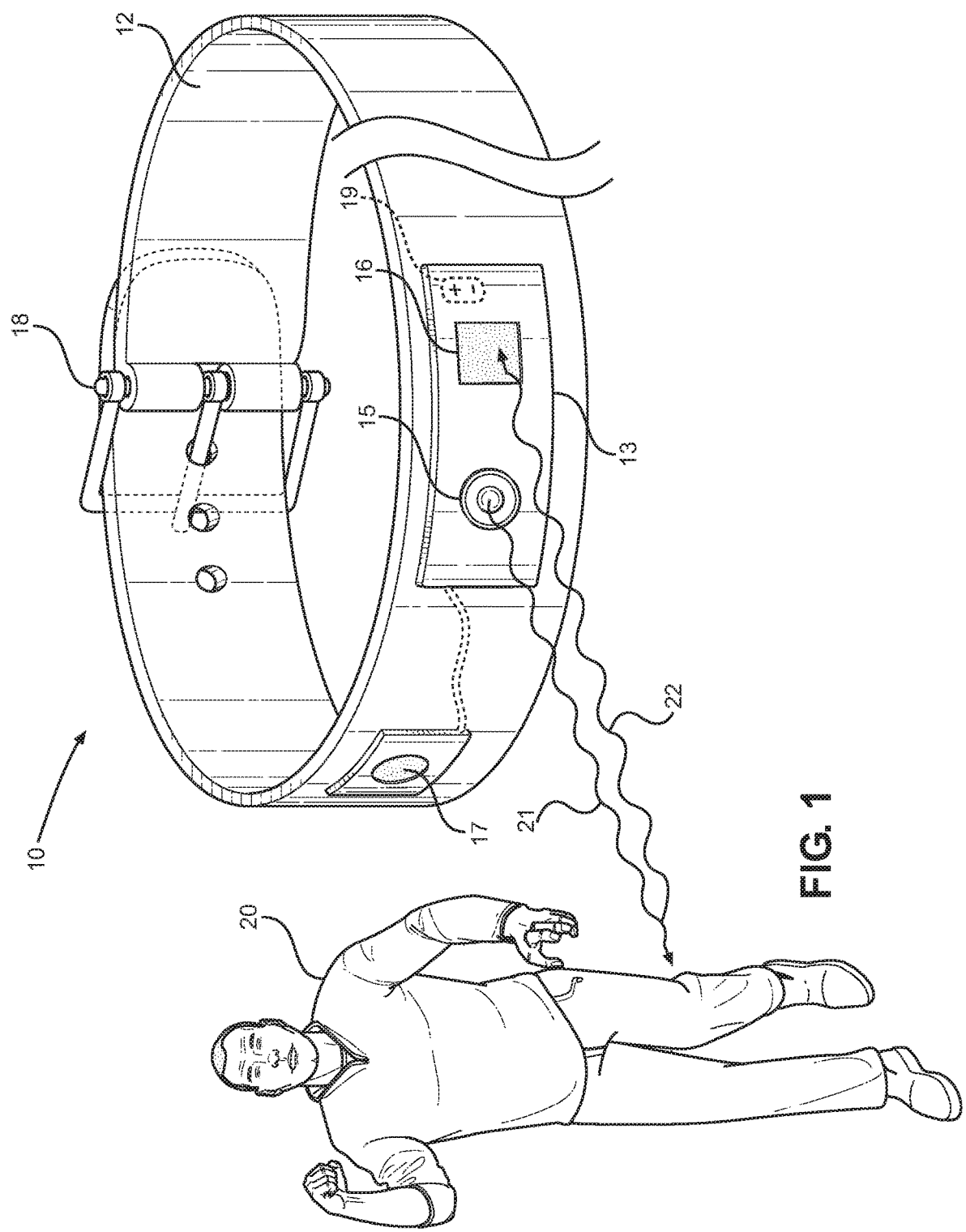
FIG. 1 shows a perspective view of an embodiment of the proximity warning assembly

Reference is made herein to the attached drawings. Like reference numerals are used throughout the drawings to depict like or similar elements of the proximity warning assembly. The figures are intended for representative purposes only and should not be considered to be limiting in any respect. Unless specifically limited to a single unit, "a" is intended to be equivalent to "one or more" throughout the present disclosure.

Referring now to FIG. 1, there is shown a perspective view of an embodiment of the proximity warning assembly. The proximity warning assembly 10 comprises a proximity sensor 13 operably connected to an emitter 15 and a receiver 16. In the illustrated embodiment, the receiver 16 is adjacent to the emitter 15. In this arrangement, the distance between the emitter 15 and receiver 16 is minimized so that the emitter 15 and receiver 16 are juxtaposed.

The emitter 15 emits an outgoing signal 21 away from the proximity sensor. The outgoing signal 21 can be reflected by an object, i.e. a reflecting object 20, and the receiver 16 is configured to detect a reflected signal 22 that returns to the proximity sensor 13. Once the reflected signal 22 is detected by the receiver 16, the proximity sensor 13 determines a relative distance between the reflecting object 20 and the proximity sensor 13. If the proximity sensor 13 detects the reflecting object 20 at one of a plurality of preset distances away from the proximity sensor 13, a proximity indicator 17 is actuated. The relative distance between the reflecting object 20 and the proximity sensor 13 can be accomplished by utilizing a time-of-flight calculation for the outgoing signal 21 and reflected signal 22. Thus, the proximity sensor 13 is adapted to be programmed with this time-of-flight calculation.

In one embodiment, the proximity sensor 13 is a passive infrared sensor. In this embodiment, the emitter 15 emEts a plurality of infrared electromagnetic waves to create a conical field-of-view stemming from the proximity sensor 13. And further, in this embodiment, the receiver is comprised of photosensitive cells or plates that are reactive to the infrared waves emitted by the emitter 15.

In a different embodiment, the proximity sensor 13 is an ultrasonic sensor, wherein the outgoing signal 21 is a longitudinal wave of ultrasonic frequency. Accordingly, in this embodiment the receiver 16 is a microphone configured to recognize the reflected signal 22 of ultrasonic frequency.

As shown in FIG. 1, the proximity indicator 17 and proximity sensor 13 are secured to a wearable band 12. In the shown embodiment, the wearable band 12 is a bracelet-style band having an adjustable securement means 18, such as a buckle. In other embodiments, the wearable band 12 is a unitary elastic band. In these embodiments, a power source 19, such as a portable and rechargeable battery, is electrically coupled to the proximity indicator 17 and the proximity sensor 13. The power source 19 is also secured to the wearable band 12.

Figure 2:
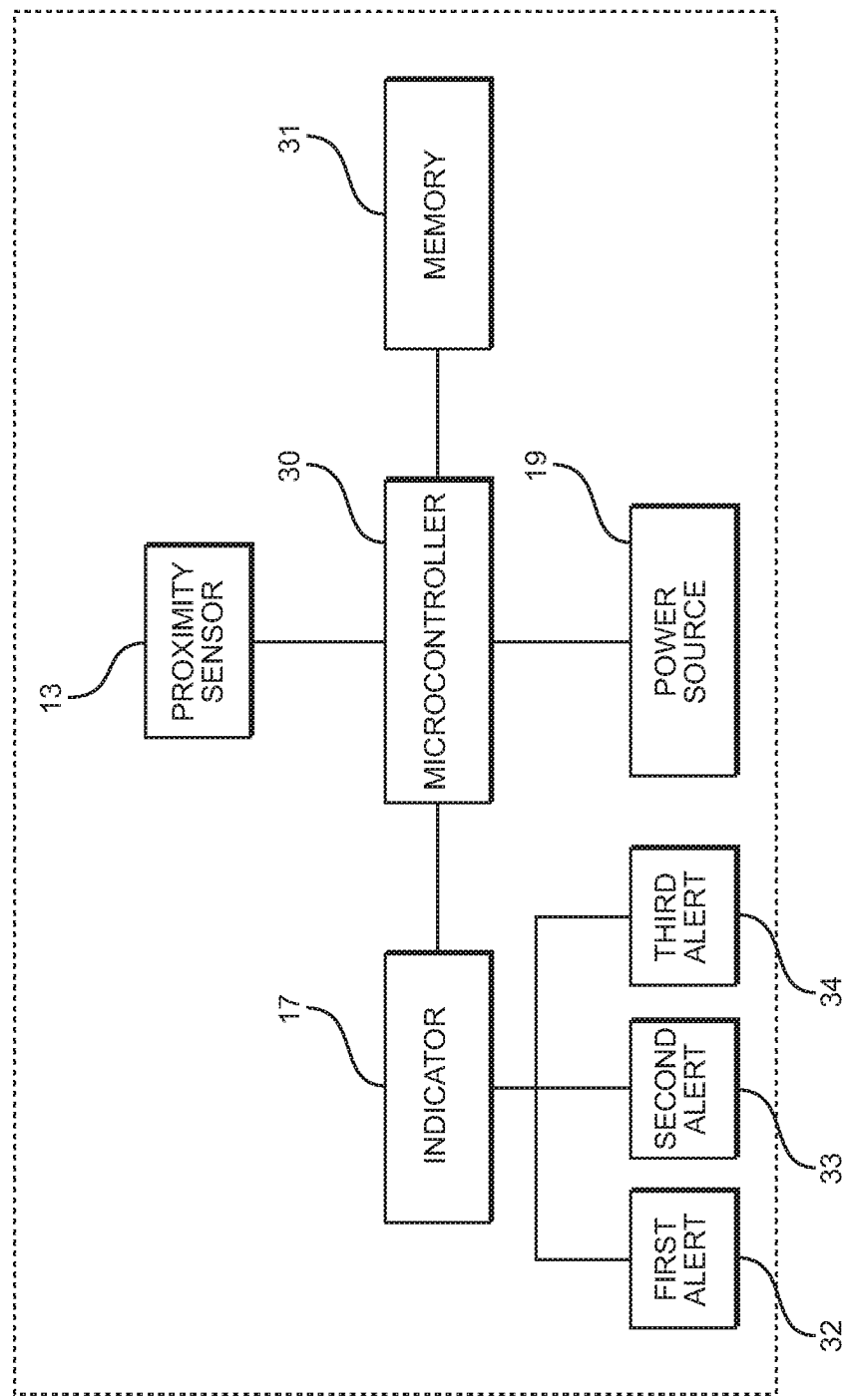
FIG. 2 shows a block diagram of the assembly shown in FIG. 1.

Referring now to FIG. 2, there is shown a block diagram of the assembly shown in FIG. 1. A microcontroller 30 is operably connected to the proximity sensor 13 and the proximity indicator 17, wherein the microcontroller 30 is configured to actuate the proximity indicator 17 when the reflecting object 20 is detected by the proximity sensor 13 at one of the plurality of preset distances away from the proximity sensor 13. The power source 19 is also electrically connected to the microcontroller 30.

The ocontroller 30 has a memory 31 on which the values of the preset distances that trigger the proximity indicator 17 are stored. In the illustrated embodiment, the microcontroller 30 actuates the proximity indicator 17 when the reflecting object 20 is detected at each of three distances away from the proximity sensor 13. The distances away from the proximity sensor 13 being twenty-five (25) feet, fifteen (15) feet and five (5) feet. In other embodiments, the proximity indicator 17 actuates when the reflecting object 20 is detected at more than three distances away from the receiver, e.g. five distances.

In the embodiment shown in FIG. 2, the proximity indicator 17 generates a unique alert for each preset distance. Specifically, in embodiments where the proximity indicator 17 actuates when a reflecting object 20 is detected at each of three preset distances, the proximity indicator produces a first alert 32 corresponding to a first preset distance from the proximity sensor, a second alert 33 corresponding to a second preset distance from the proximity sensor, and a third alert 34 corresponding to a third distance from the proximity sensor. These alerts can be audio, visual or a combination of both. In the shown embodiment, the proximity indicator 17 is a speaker where the first alert 32 is a single beep, the second alert 33 is two beeps in rapid succession, and the third alert 34 is three beeps in rapid succession.

Figure 3:
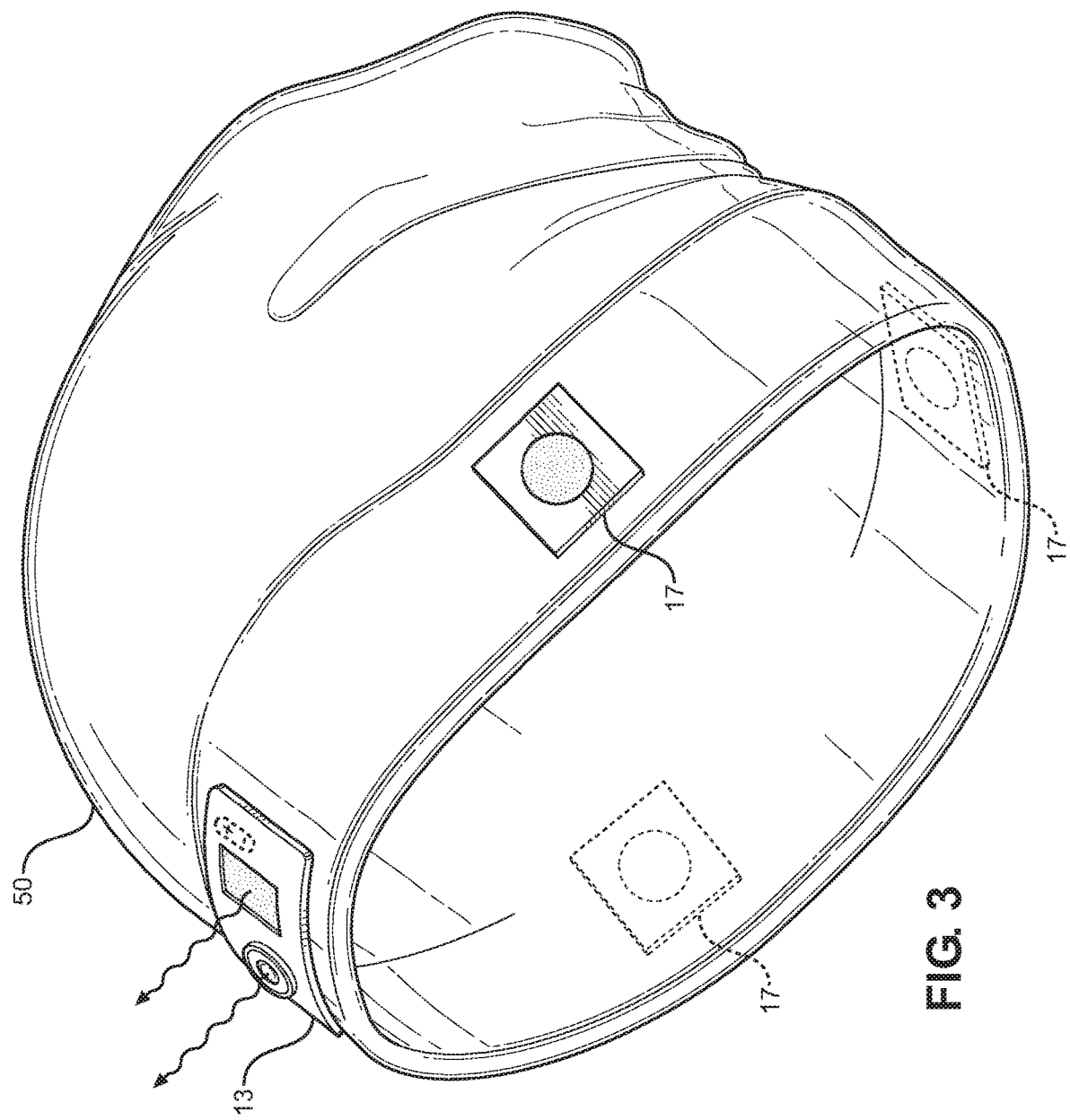
FIG. 3 shows a perspective view of an alternate embodiment of the proximity warning assembly.

Referring now to FIG. 3, there is shown a perspective view of an alternate embodiment of the proximity warning assembly. To provide convenience to a user when exercising, the wearable band to which the proximity indicator 17 and proximity sensor 13 are disposed on is in the form of a hat 50. Furthermore, in this alternative embodiment, multiple proximity indicators 17 are utilized. Here, the proximity indicators 17 are spaced equidistance from each other around the hat 50. Each one of the proximity indicators 17 produces a unique alert, wherein each alert corresponds to one of a plurality of preset distances away from the proximity sensor 13. In use, the hat 50 is dawned with the proximity sensor 13 facing to the rear of a user.

A method is also provided for alerting a user of an impending attacker utilizing the proximity warning assembly. The method includes the steps of providing a user with the wearable band 12, 50 having the proximity warning assembly 10 disposed thereon. The method further includes alerting the user of the presence of the reflecting object 20, e.g. an aggressor, once the reflecting object 20 is detected at one of a plurality of preset distances away from the proximity sensor 13. This alerting is accomplished by generating unique alert signals that correspond to each distance of the plurality of present distances away from the proximity sensor 13.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A proximity warning assembly, comprising:
    a proximity sensor operably connected to an emitter and a receiver, wherein the receiver is configured to detect a reflected signal from the emitter;
    the proximity sensor configured to determine a distance between a reflecting object and the receiver;
    a proximity indicator;
    a microcontroller operably connected to the proximity sensor and the proximity indicator, wherein the microcontroller is configured to actuate the proximity indicator to produce a unique alert when the reflecting object is detected at each of a plurality of preset distances from the proximity sensor;
    a wearable band, wherein the microcontroller, proximity sensor and proximity indicator are affixed thereto;
    wherein the emitter and the receiver are disposed on an external face of the wearable band.

2. The proximity warning assembly of claim 1, wherein the microcontroller is configured to actuate the proximity indicator to produce a first alert signal when the reflecting object is detected at a first preset distance from the proximity sensor, a second alert signal when the reflecting object is detected at a second preset distance from the proximity sensor, and a third alert signal when the reflecting object is detected at a third preset distance from the proximity sensor.

3. The proximity warning assembly of claim 2, wherein the first alert signal, second alert signal, and third alert signal are audio signals.

4. The proximity warning assembly of claim 2, wherein the proximity indicator includes a plurality of proximity indicators affixed to the wearable band, wherein each proximity indicator of the plurality of proximity indicators corresponds to one of the first alert signal, the second alert signal, and the third alert signal.

5. The proximity warning assembly of claim 1, wherein the proximity sensor is a passive infrared sensor.

6. The proximity warning assembly of claim 1, wherein the proximity sensor is an ultrasonic sensor.

7. The proximity warning assembly of claim 1, wherein the proximity indicator produces an audio alert.

8. The proximity warning assembly of claim 1, wherein the wearable band is a hat.

9. The proximity warning system of claim 1, wherein the wearable band comprises an adjustable securement means.

10. The proximity warning system of claim 9, wherein the adjustable securement means is a buckle.

11. The proximity warning system of claim 1, wherein the wearable band is a unitary elastic band.

12. The proximity warning system of claim 1, wherein the wearable band comprises a power source.

13. The proximity warning system of claim 12, wherein the power source is a portable and rechargeable battery.

14. The proximity warning system of claim 1, wherein a memory is in operable connection with the microcontroller.

15. The proximity warning system of claim 14, wherein a value of each preset distance of the plurality of preset distances is defined on and stored on the memory.

* * * * *